United States Patent
Brooks (10) Patent No.: US 10,629,200 B2
(45) Date of Patent: Apr. 21, 2020

(54) VOICE ANALYSIS TRAINING SYSTEM

(71) Applicant: SalesBoost, LLC, Plano, TX (US)

(72) Inventor: Margaret L Brooks, Plano, TX (US)

(73) Assignee: SalesBoost, LLC, Plano, TX (US)

( * ) Notice: Subject to any disclaimer, the term of this patent is extended or adjusted under 35 U.S.C. 154(b) by 178 days.

(21) Appl. No.: 15/914,893

(22) Filed: Mar. 7, 2018

(65) Prior Publication Data

US 2018/0261219 A1   Sep. 13, 2018

Related U.S. Application Data (60) Provisional application No. 62/468,266, filed on Mar. 7, 2017.

(51) Int. Cl.

| | |
|---|---|
| *G10L 15/22* | (2006.01) |
| *G06F 16/683* | (2019.01) |
| *G10L 25/48* | (2013.01) |
| *G06Q 10/06* | (2012.01) |
| *G10L 15/10* | (2006.01) |

(52) U.S. Cl.
CPC ............ *G10L 15/22* (2013.01); *G06F 16/683* (2019.01); *G06Q 10/06398* (2013.01); *G10L 15/10* (2013.01); *G10L 25/48* (2013.01); *G10L 2015/225* (2013.01)

(58) Field of Classification Search
CPC ...................................................... G10L 15/22
See application file for complete search history.

(56) References Cited

U.S. PATENT DOCUMENTS

| | | | | |
|---|---|---|---|---|
| 7,739,115 | B1 * | 6/2010 | Pettay | G10L 15/26 704/270 |
| 8,907,195 | B1 * | 12/2014 | Erol | G09B 5/06 84/609 |
| 9,984,682 | B1 * | 5/2018 | Tao | G10L 15/16 |
| 10,446,055 | B2 * | 10/2019 | Gupta | H04N 5/76 |
| 10,446,167 | B2 * | 10/2019 | Lindahl | G10L 21/0208 |
| 2002/0123925 | A1 * | 9/2002 | Smith | G06Q 30/02 705/14.19 |
| 2003/0156706 | A1 * | 8/2003 | Koehler | G09B 5/00 379/265.05 |
| 2005/0015253 | A1 | 1/2005 | Rambo et al. | |
| 2006/0009979 | A1 * | 1/2006 | McHale | A63F 13/10 704/270 |
| 2007/0015121 | A1 * | 1/2007 | Johnson | G09B 7/02 434/156 |

(Continued)

*Primary Examiner* — Douglas Godbold
(74) *Attorney, Agent, or Firm* — McGuireWoods LLP (57) ABSTRACT

A method for performing voice analysis includes storing a simulation file having a script for conducting a training session with a user. The method also stores desired attributes associated with the simulation file. The method also includes retrieving the simulation file and providing a user interface to conduct the voice analysis using the simulation file. The method further includes receiving one or more voice impressions from a user and analyzing at least one of the voice impressions of the user. The method additionally includes determining attributes of the at least one voice impression in response to analyzing the at least one voice impression and comparing the determined attributes to the desired attributes associated with the simulation file. The method provides feedback to the user based on the comparison.

20 Claims, 5 Drawing Sheets

(56) References Cited

U.S. PATENT DOCUMENTS

| | | | |
|---|---|---|---|
| 2007/0100626 A1* | 5/2007 | Miller | G09B 21/009 704/258 |
| 2008/0152121 A1* | 6/2008 | Mandalia | H04M 3/51 379/265.01 |
| 2011/0231194 A1* | 9/2011 | Lewis | G10L 21/06 704/276 |
| 2011/0282662 A1* | 11/2011 | Aonuma | G10L 17/26 704/231 |
| 2012/0039460 A1* | 2/2012 | Krishnapuram | H04M 3/51 379/265.07 |
| 2015/0004571 A1* | 1/2015 | Ironside | G09B 5/10 434/185 |
| 2015/0195406 A1* | 7/2015 | Dwyer | H04M 3/5175 379/265.07 |
| 2015/0350438 A1* | 12/2015 | Arslan | G10L 25/63 379/88.01 |
| 2016/0049094 A1* | 2/2016 | Gupta | G09B 19/04 434/185 |
| 2016/0183868 A1* | 6/2016 | Rot | A61B 5/4803 434/185 |
| 2016/0316059 A1* | 10/2016 | Nuta | H04M 3/5175 |
| 2016/0350699 A1* | 12/2016 | Vymenets | G06Q 10/06311 |
| 2017/0069226 A1* | 3/2017 | Spinelli | G09B 5/04 |
| 2017/0092151 A1* | 3/2017 | Xi | G09B 5/06 |
| 2018/0096617 A1* | 4/2018 | Tapuhi | G09B 7/00 |
| 2018/0168905 A1* | 6/2018 | Goodall | A61N 1/0456 |
| 2019/0096401 A1* | 3/2019 | Honda | G06F 3/167 |

\* cited by examiner

VOICE ANALYSIS TRAINING SYSTEM

BACKGROUND

The present disclosure relates generally to systems and methods to conduct voice analysis training with automated real-time analysis and feedback of a voice impression of a user.

Training employees generally relies on a large investment of time and resources to have the employees performing tasks at a desired level. A manager, who is also overseeing the work of employees not currently undergoing training, may not have the time or resources to provide new or underperforming employees with adequate training. Further, the manager may not have the time or resources to provide adequate training to maintain seasoned employees at their optimal performance levels.

Traditionally, the managers, when encountered with limited time, provide employees with access to off-site training. The off-site training may be expensive, and the manager is generally unable to monitor progress of employees at the off-site training. Effectiveness of the off-site training is also generally unproven and the quality is unreliable. Alternatively, when the manager does not have the resources to send employees to off-site training, the manager may not have adequate time to provide the training in an in-house setting. As a particular example, a customer representative may receive great value from role-playing or job shadowing, but such training relies on valuable time resources. As used herein, the term "customer representative" shall mean a customer representative, a sales or marketing representative, a help desk representative, a call center representative, a client account manager, or any other representative of an organization that interfaces with customers, potential customers, or the general public. Because of the difficulties associated with off-site training and traditional in-house training, the manager may benefit from alternative training methods for employees.

Further, when a manager relies on training tools that lack user interaction or an ability to monitor progress, the manager may be faced with difficulty tracking the progress of the employee using the training tools, or knowing whether the training tools are being used at all. These traditional training tools may also provide training units that are not applicable to specific job functions of the employees. In such a situation, the employees or the manager are forced to wade through unwanted material to reach the training material applicable to the specific job functions of the employees.

SUMMARY OF THE DISCLOSED EMBODIMENTS

The disclosed embodiments include a voice analysis training system that includes an application programming interface (API), which includes routines for providing voice analysis training. The voice analysis training system also includes a client application, which transmits voice impressions and control interactions from a user to a server, and an audio analysis tool, which receives the voice impressions from the server and analyzes voice qualities of the voice impressions. Additionally, the voice analysis training system includes the server in network communication with the API, the client application, and the audio analysis tool. The server provides an interface between the API, the client application, and the audio analysis tool. The client application receives analysis of the voice impressions from the audio analysis tool via the server, and the client application provides automated feedback to the user based on the analysis of the voice impressions.

In one embodiment of the proposed invention, a method for performing voice analysis includes storing, in a database, a simulation file for conducting a training session with a user, the simulation file including at least a script. The method includes further storing, in the database, desired attributes associated with the simulation file. The method also includes retrieving, by a server, the simulation file from the database and providing, by a client application, a user interface to conduct the voice analysis using the simulation file from the database. The method further includes receiving, at the client application, one or more voice impressions from a user and analyzing, at an audio analysis tool, at least one of the voice impressions of the user. The method additionally includes determining, at the audio analysis tool, attributes of the at least one voice impression in response to analyzing the at least one voice impression and comparing, at the audio analysis tool, the determined attributes to the desired attributes associated with the simulation file. The method provides, by the client application, feedback to the user based on the comparison.

Additional details of the disclosed embodiments are provided below in the detailed description and corresponding drawings.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

In the description that follows, the drawing figures are not necessarily to scale and certain features may be shown in generalized or schematic form in the interest of clarity and conciseness or for informational purposes. In addition, although making and using various embodiments are discussed in detail below, it should be appreciated that many inventive concepts are described that may be embodied in a wide variety of contexts. Embodiments discussed herein are merely representative and do not limit the scope of the claimed subject matter.

Embodiments of a voice analysis training system are disclosed herein that automate training of users based on voice analysis of the user during a simulation. Using the voice analysis training system described herein avoids costly off-site or on-site training and encourages completion of training. For example, a manager may monitor training progress and set training goals of employees reporting to the manager. Further, the voice analysis training system provides a user and/or manager with verifiable and observable results.

More particularly, various embodiments of the present invention utilize voice analysis to determine the effectiveness of communications of a user for a particular task. For purposes of this application, voice impressions will refer to particular recordings of the speech of an individual during a particular session pursuant to which the individual is participating in a particular interaction with a training simulation or actual person. Such voice impressions are first analyzed to determine attributes of such voice impression during such interaction. Such determined attributes are then compared to or assessed relative to model attributes that represent preferred or ideal attributes in such interactions. For example, for a session involving an interaction with a customer for the sale of a particular product or service, determined attributes of a voice impression may be compared to or assessed relative to model attributes that have been empirically demonstrated to result in a high percentage of sales closings. Based on such comparison or assessment, feedback may be presented to a user as to the effectiveness of their communication during the session or as to recommendations that may be adopted by the user to improve such effectiveness.

For purposes of this application, attributes are any indication of emotion, personality, interest, opinion, energy level, confidence level, demographics, mental or physical state, or other characteristic of an individual that can be determined from a voice impression based on an analysis of the waveform of such voice impression, whether directly or indirectly based on the application of filters and functions, and whether from the audio characteristics of such waveform or from secondary determinations of body or facial position or expression of such individual based on such waveform. For example, the pitch, tone, amplitude, cadence, or transients of such waveform may directly indicate the energy level of an individual. Alternatively, characteristics of the waveform may be used to determine whether the individual is smiling or frowning while communicating. Attributes measurable by various embodiments of the present invention may include, without limitation, arousal (energy level), joy, trust, interest level, surprise, sadness, disgust, anger, happiness, disappointment, confidence, pleasure, satisfaction, attraction, contentment, fear, ecstasy, grief, vigilance, admiration, repugnance, amazement, curiosity, acceptance, doubt, distraction, pervasiveness, apprehension, annoyance, boredom, serenity, anticipation, age, sex, locality of origin, education level, personality type, inebriation, sleepiness, health issues, posture, or any other characteristic measurable in whole or in part by voice analysis. In one embodiment, video recording may be used to determine attributes based on both physical and voice characteristics of a user.

In some embodiments of the present invention, the content of the voice impression (such as the order and meaning of the words communicated) may be analyzed in combination with the attributes of the voice impression to better assess or evaluate the effectiveness of communication example, when such content of a voice impression indicates that a customer service representative is attempting to resolve a tense situation with a customer, the attributes of the voice impression can be analyzed to detect attributes such as calmness, confidence, and sympathy.

Figure 1:
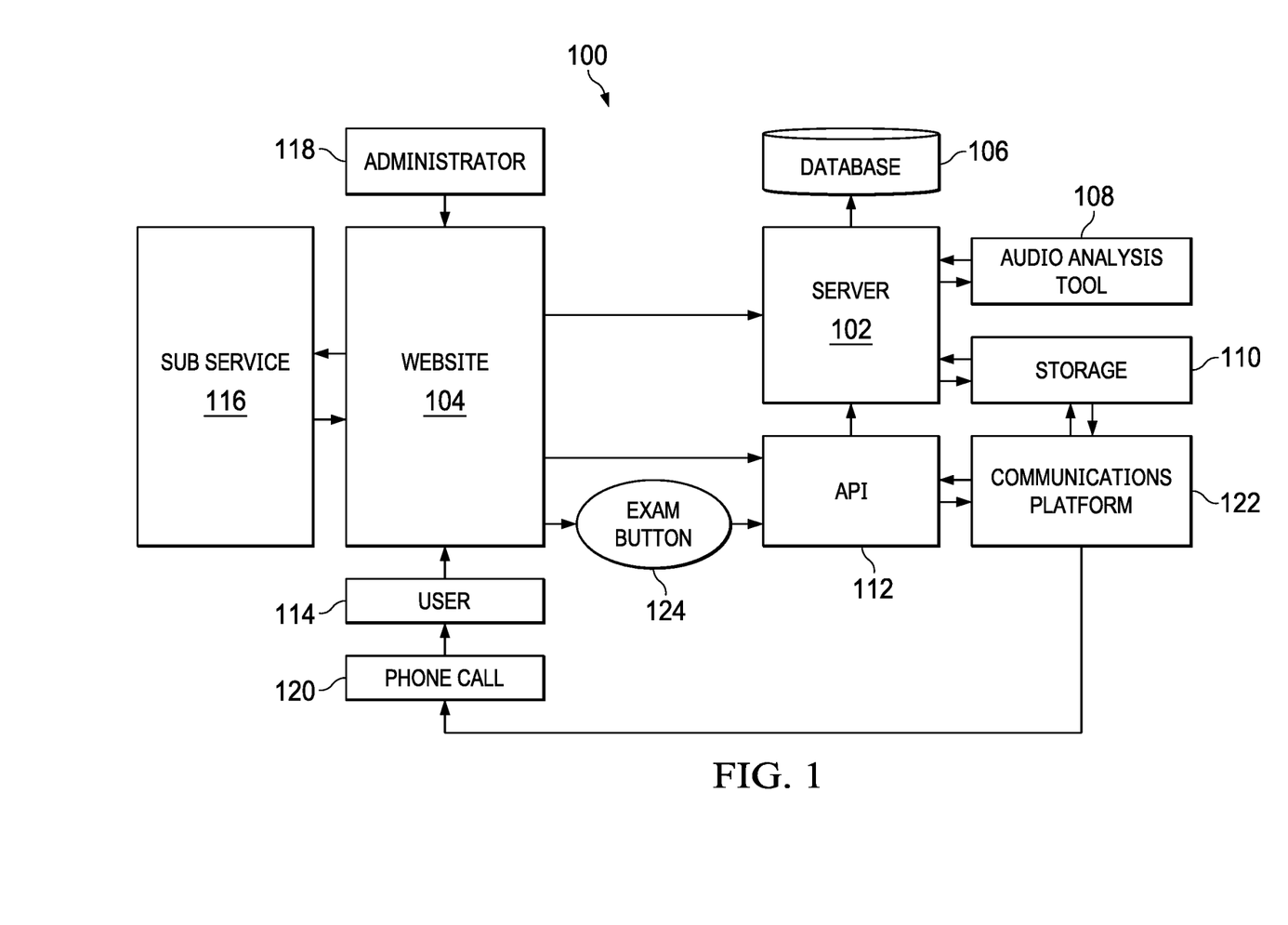
FIG. 1 is a network diagram and system diagram of a voice analysis training system, in accordance with a disclosed embodiment.

Referring now to the drawings, FIG. 1 is a network diagram of a voice analysis training system 100, in accordance with a disclosed embodiment. In an embodiment, the voice analysis training system 100 includes a server 102 communicatively coupled to a client application 104, a database 106, an audio analysis tool 108, data storage 110, and an application programming interface (API) 112. The client application 104 provides an interface for a user 114 to interact with the voice analysis training system 100. In one embodiment, client application 104 is a web-based application. In alternative embodiments, client application 104 may be a mobile application such as a smart phone application or other suitable application for communicating with voice analysis training system 100. Additionally, the client application 104 provides an interface for providing a subscription service 116 that handles payments for a subscription from the user 114 and an interface for an administrator 118 to upload new simulations to the voice analysis training system 100 and other administrative tasks that may be desired by the administrator 118. When the administrator 118 uploads new simulations, the new simulations are transmitted to and stored in the database 106 via the server 102. The client application 104 also interacts with the server 102 by providing subscription information from the subscription service 116 to create a new account with the voice analysis training system 100.

While the client application 104 is described below with respect to voice analysis training, the client application 104 may also include a series of lesson-based training systems. For example, the client application 104 may include a library of lesson units that are catered to different job functions within a company and are stored at the database 106 or the data storage 110 for access by the client application 104. In a hospitality embodiment, the client application 104 may include, for example, lesson units related to increasing effectiveness of business travel sales by customer representatives, increasing effectiveness of catering sales by customer representatives, increasing effectiveness of conference sales by customer representatives, increasing effectiveness of group sales by customer representatives, increasing leadership effectiveness of hotel management, and maximizing marketing initiatives by marketing teams at the hotel. Although many embodiments of this application are described relative to customer representatives, one of ordinary skill in the art will appreciate that the same embodiments can equally apply to other individuals or employees for communications training in a variety of business functions and situations. For example, training may be offered to a manager to recommend better ways of communicating with those under the manager's supervision.

Additionally, all of these lesson units may include one or more training simulations, as discussed in detail below, that relate directly or indirectly to the topics of each lesson unit. Additionally, use of the voice analysis training system 100 in other industries that rely on sales or communication effectiveness are also contemplated within the scope of the present disclosure.

The client application 104 provides an interface for the user 114 to interact with the voice analysis training system 100. In operation, the user 114 provides an indication at the client application 104 to begin a training session. In an embodiment, the training sessions include simulations in which the user 114 receives prompts to answer during a phone call 120. The phone call 120, for example, using a communications platform 122, asks the user 114 a question or recites other scripted statements, narratives, or scenarios that are preloaded into the data storage 110 as a simulation file. The preloaded questions and statements are based on scenarios that the user 114 may experience during a typical customer interaction. The typical interaction with a customer, in an embodiment, may be related to the user 114 working as a salesperson. As an example, the simulation may involve a prospective customer calling to ask questions about products or services provided by the user 114. The questions presented by the prospective customer are preloaded into the data storage 110 and provided to the user 114 during the phone call 120 by the communications platform 122.

During the phone call 120, the user 114 interacts with the API 112 of the voice analysis training system 100. The client application 104 may include an exam button 124 that provides the user 114 with an element to interact with the API 112. The exam button 124 may be a single interaction element within the client application 104, a series of interaction elements within the client application 104, or a voice-activated trigger within the client application 104. As used herein, the term interaction element may refer to an element within the client application 104 that the user 114 is able to interact with using a mouse click or another selection operation by the user 114. Additionally, the voice-activated trigger, as used herein, may refer to an element within the client application 104 that begins an operation when the user 114 begins speaking. In this manner, the exam button 124 may provide an indication from the user 114 to the API 112 to start the phone call 120, an indication that the user 114 is about to respond to a question provided by the communications platform 122, an indication that the user 114 has stopped responding to the question provided by the communications platform 122, an indication to pause the phone call 120, and/or an indication to resume the phone call 120. As used herein, the term phone call 120, may refer to an actual phone call from the communications platform 122 to the user 114, or the term phone call 120 may refer to a simulation confined to input and output provided by a computing device on which the client application 104 is running.

When the API 112 receives the indications from the user 114 via the exam button 124, the API 112 provides instructions to the communications platform 122 to pause or resume the phone call 120. For example, after the communications platform 122 asks the user 114 questions of the simulation, the user 114 interacts with the exam button 124 to indicate that the user 114 is about to respond to the question. Upon receiving the indication from the exam button 124, the API 112 instructs the communications platform 122 to pause the simulation until the API 112 receives another indication via the exam button 124 that the user 114 is finished responding to the question. At that point, the API 112 instructs the communications platform 122 to resume the simulation until the API 112 receives another indication from the user 114 to pause the simulation.

The communications platform 122, upon receiving an indication from the API 112 to begin a training simulation, sends a request to receive a simulation file stored in the data storage 110. As discussed above, simulation files may include one or a series of scripted questions, statements, narrative or other scenarios for response and reaction to by the user 114. The simulation file is received from the data storage 110 at the communications platform 122, and the simulation file may correspond with a specific training simulation related to specific job functions of the user 114. Additionally, in an embodiment, the simulation file may correspond to a specific skill that the user 114 wishes to practice. The simulation file may be broken up into individual words, sentences, segments, by topic, or in other suitable portions, each of which may be stored separately. Hereafter, such portions shall be referred to for purposes of this application as snippets.

When the communications platform 122 receives the simulation file from the data storage 110, the communications platform 122 initiates the phone call 120 to the user 114. During the phone call 120, the communications platform 122 may record the response of the user 114 to questions of the simulation. In another embodiment, the client application 104 records the responses of the user 114. The response of the user 114 may generally be referred to as a voice impression of the user 114. In either scenario, the voice impression is provided to the data storage 110 via the communications platform 122 or directly from the client application 104.

Upon receipt of the voice impression of the user 114 at the data storage 110, the server 102 provides an indication to the audio analysis tool 108 that the voice impression is ready for analysis. The audio analysis tool 108 then receives the voice impression from the data storage 110 and analyzes the voice impression to determine attributes of the voice impression, the purpose of the communication, the goals of the user 114, or the business role of the user 114. More particularly, analyzing the voice impression may include an analysis of the waveform of such voice impression, whether directly or indirectly based on the application of filters and functions, and whether from the audio characteristics of such waveform or from secondary determinations of body or facial position or expression of such individual based on such waveform. In one embodiment, and similar to simulation files, each word, sentence, or other portion of the voice impression may be stored in snippets to allow audio analysis tool 108 to determine attributes of each snippet. In such a manner, a longer simulation session may be broken up into snippets to give the user 114 individual feedback on each snippet based on attributes determined for each snippet. Snippets of voice impressions may be further analyzed and feedback by determining matching snippets of voice impressions with corresponding snippets of simulation files. In such a manner, the context, situation, goals, and details of particular snippets of a simulation file allow a corresponding snippet of a voice impression to be evaluated much more precisely and more relevant feedback given to the user 114. The analysis provided by the audio analysis tool 108 may be stored in the database 106 in snippets to generate a training record of each user 114 using the voice analysis training system 100.

The server 102 requests the analysis results from the audio analysis tool 108, and the server 102 provides the analysis results and feedback to the user 114 via the client application 104. Embodiments of the analysis results, which are discussed in greater detail below with respect to FIGS. 4 and 5, may include an indication of the effectiveness of the user 114 at accomplishing the specific job function of the user 114. For example, the analysis results may provide an indication of sales effectiveness of the user 114 throughout the voice impression. In an embodiment, the client application 104 also provides the user 114 with feedback for improving the effectiveness of the user 114 in responding to the questions provided to the user 114 during the phone call 120. For example, the client application 104 may instruct the user 114 to sit in a more upright position or to smile while speaking to change a tone of the voice of the user 114 to be more effective at making a positive sales pitch. Other suggestions to the user 114 are also contemplated in response to the analysis of the voice impression by the audio analysis tool 108.

In one embodiment, voice analysis training system 100 maintains separate user accounts for a number of users such as user 114. Those separate user accounts may in turn be organized under master accounts. In such a manner, the separate user accounts can be used to track the training and performance of multiple users individually. Master accounts may be used by a user 114 to access all of the separate user accounts organized under such master account. For example, a hotel customer service manager or executive can use a master account to assess the training and performance of each of a number of customer representatives in the manager's or the executive's organization, such as a particular department of the hotel or the hotel entity as a whole. Each user account may be associated with a particular job function identifier. Each job function identifier identifies a particular business role for the user 114. For example, a customer service representative would have a different job function identifier from a sales representative. Voice impressions of the user 114 may be evaluated differently depending on which job function identifier is associated with such user 114. For example, if a user 114 is associated with a job function identifier for a customer service representative, sympathy, calmness, and confidence may be important factors that voice analysis training system 100 uses to evaluate the performance of the user 114. Similarly, if a user 114 is associated with a job function identifier for a sales representative, arousal (energy level), excitement, and confidence may be important factors that voice analysis training system 100 uses to evaluate the performance of the user 114.

Figure 2:
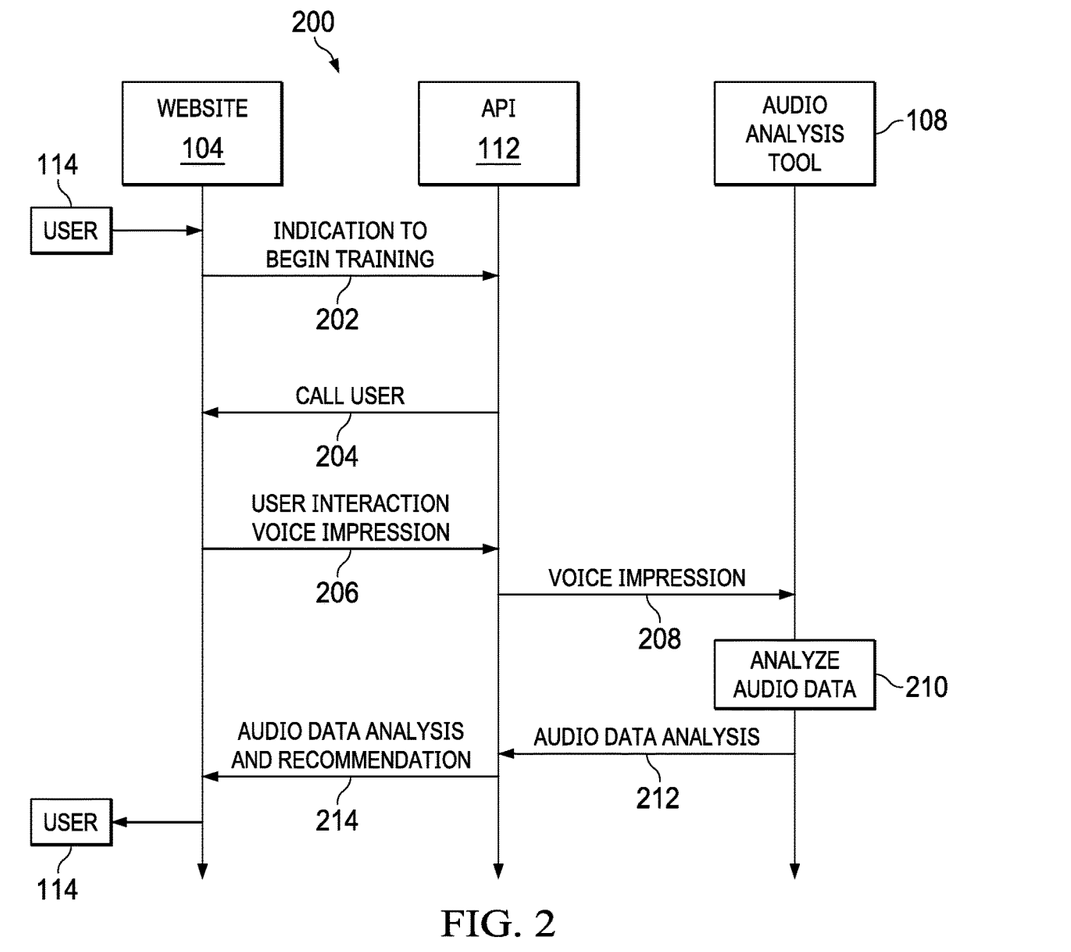
FIG. 2 is a sequence diagram depicting an overview of a voice analysis training process, in accordance with a disclosed embodiment.

FIG. 2 is a sequence diagram 200 depicting an overview of a voice analysis training process, in accordance with a disclosed embodiment. In an embodiment, the user 114 interacts with the client application 104 at step 202 to indicate to the API 112 that a training simulation should begin. As discussed above with respect to FIG. 1, the user 114 instructs the API 112 to begin the training simulation based on interaction of the user 114 with the exam button 124.

Once the API 112 receives the indication to begin the training simulation, the API 112 instructs the communications platform 122 (shown in FIG. 1), at step 204, to call the user 114 to begin the training simulation. The API 112 may also provide instructions to the communications platform 122 about what scenario the training simulation should simulate based on a specific job function of the user 114, or based on a specific skill that the user 114 wishes to practice. In an embodiment, the training simulation may be a scripted simulation, or the training simulation may be a dynamic simulation that is capable of changing the script of the simulation in response to answers provided by the user 114.

At step 206, the API 112 receives the voice impression from the user 114. The API 112 may receive the voice impression from the user 114 via the communications platform 122 during the training simulation. At step 208, the voice impression is transmitted from the API 112 to the audio analysis tool 108 via the server 102 (shown in FIG. 1). In another embodiment, the voice impression may be transmitted from the client application 104 to the audio analysis tool 108 via the server 102.

Upon receiving the voice impression, the audio analysis tool at block 210 analyzes the audio data of the voice impression of the user 114. Analysis may include analyzing attributes of the voice impression, such as the tone of the user 114, analyzing the emotion of the user 114, and/or analyzing other audio qualities based on an intent behind the voice impression (e.g., the purpose of the communication). For example, a user 114 working in a sales role at a hotel may wish to maintain a high level of enthusiasm throughout the phone call 120. Accordingly, the audio analysis tool 108 may analyze the tone of the voice impression for an indication of enthusiasm. In another embodiment, a user 114 operating as a customer representative of a hotel may wish to maintain an empathetic tone throughout the phone call 120. Accordingly, the audio analysis tool 108 may analyze the tone of the voice impression for an indication of empathy. While specific examples of analyzing voice impressions are given in FIGS. 1 and 2, a more complete discussion of voice impressions will be discussed relative to FIG. 5.

After completing the analysis of the voice impression, the audio analysis tool 108 returns the analysis to the API 112 at step 212. From there, the API 112 may also add a recommendation to the analysis and send the analysis and the recommendation to the client application 104 and the user 114 at step 214. The recommendation may be based on the specific job function of the user 114 (e.g., sales, customer service, etc.), and the recommendation provides suggestions to the user 114 to improve performance on the simulation. Upon completion of the simulation (e.g., when the user 114 receives the analysis and recommendation), the user 114 may repeat the simulation after taking into account the recommendations provided at step 214. Additionally, the user 114 may begin a new simulation related to a weakness that the user 114 exhibited during the original simulation to provide the user 114 with additional practice to overcome the exhibited weakness. While FIG. 2 describes the recommendation originating from the API 112, it may be appreciated that the recommendation may also be generated by the audio analysis tool 108 and transmitted to the client application 104 via the server 102 along with the analysis of the voice impression.

Figure 3:
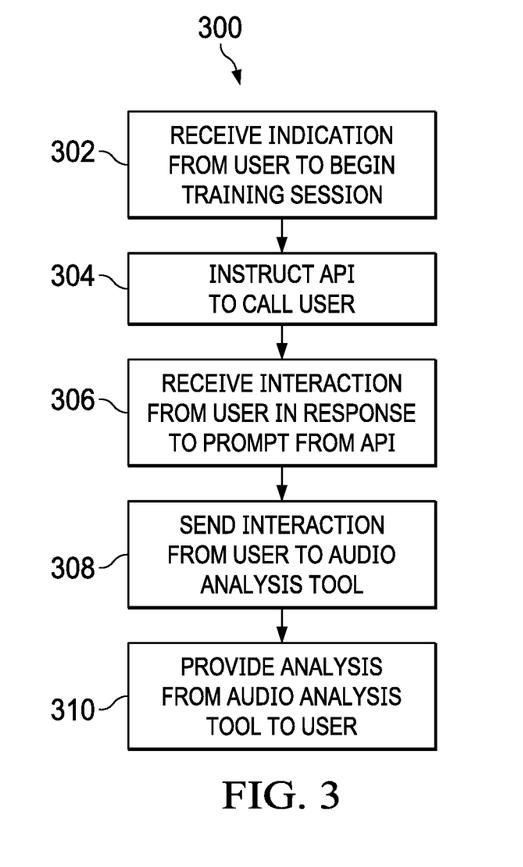
FIG. 3 is a flowchart depicting a method for performing voice analysis of a user, in accordance with a disclosed embodiment.

FIG. 3 is a flowchart depicting a method 300 for performing voice analysis of the voice impression of the user 114, in accordance with a disclosed embodiment. In an embodiment, at block 302, an indication from the user 114 is received at the web-based application 104 to begin a training session. In addition to indicating at the client application 104 that the training session should begin, the user 114 may enter a telephone number at which the user is reachable to create a life-like scenario of the phone call 120. The user 114 may also enter an indication of a specific scenario that the user 114 desires to train under, or, in another embodiment, the user 114 may enter the specific job function of the user 114 such that a training session related to the specific job function is initiated. As discussed above with respect to FIG. 1, the user 114 instructs the API 112 to begin the training simulation based on interaction of the user 114 with the exam button 124.

At block 304, the API instructs the communications platform 122 to call the user 114 at the number provided by the user in block 302, or over the client application 104 to begin the training session simulation. The API 112 may also provide instructions to the communications platform 122 about what scenario the training session should simulate based on the specific job function of the user 114 or based on a specific skill that the user 114 wishes to practice. In an embodiment, the training simulation may be a scripted simulation, or the training simulation may be a dynamic simulation that is capable of changing the script of the simulation based on responses provided by the user 114.

When the training session is entirely scripted, the user 114 is provided with a script for responding to questions in the training simulation, and analysis is performed based on speech inflection of the user 114 during the training simulation.

At block 306, the API 112 receives a voice impression from the user 114 in response to the questions posed by the training simulation. The API 112 may receive the voice impression from the user 114 via the communications platform 122 during the training simulation or from the client application 104. At block 308, the voice impression is transmitted from the API 112 to the audio analysis tool 108 via the server 102. Upon receiving the voice impression at block 308, the audio analysis tool analyzes the audio data of the voice impression of the user 114. Analysis may include analyzing the tone of the user 114, analyzing the emotion of the user 114, and/or analyzing other audio qualities based on an intent behind the voice impression (e.g., the purpose of the communication). For example, a user 114 working as a sales representative at a hotel may wish to maintain high level of enthusiasm throughout the phone call 120. Accordingly, the audio analysis tool may analyze the tone of the voice impression for an indication of enthusiasm. In another embodiment, a user 114 operating as a customer service representative of a hotel may wish to maintain an empathetic tone throughout the phone call 120. Accordingly, the audio analysis tool may analyze the tone of the voice impression for an indication of empathy.

After completing the analysis of the voice impression, the audio analysis tool 108 returns the analysis to the user 114 via the client application 104 at block 310. A recommendation may also be provided to the user 114 along with the analysis at the web-based application 104. The recommendation may be based on the specific job function of the user 114 (e.g., sales, customer service, etc.), and the recommendation provides suggestions to the user 114 to improve user performance on the simulation. Upon completion of the simulation (e.g., when the user 114 receives the analysis and recommendation), the user 114 may repeat the simulation after taking into account the recommendations provided at block 310. Additionally, the user 114 may begin a new simulation related to a weakness that the user 114 exhibited during the original simulation to provide the user 114 with additional practice to overcome the exhibited weakness.

Figure 4:
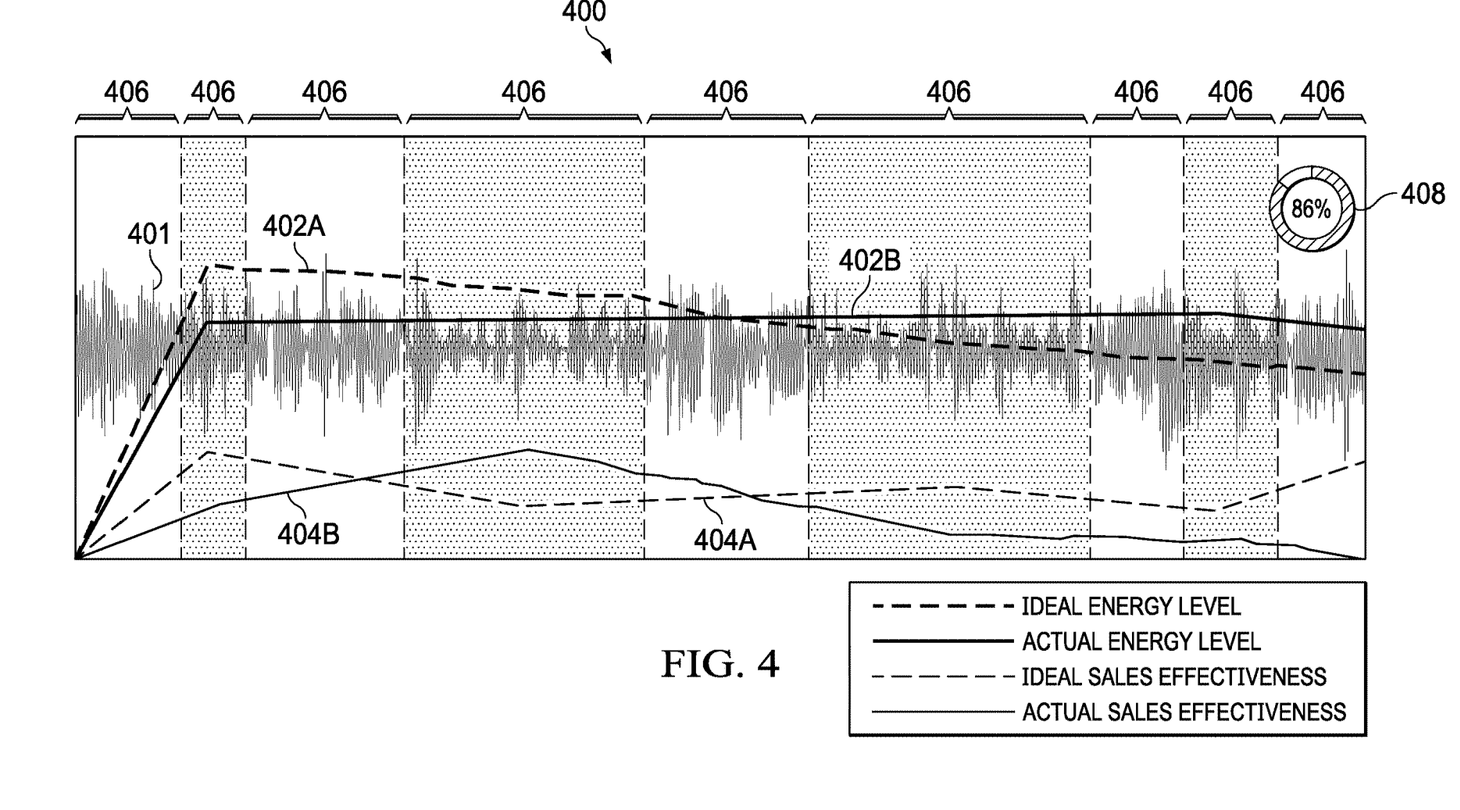
FIG. 4 is a spectrogram of a voice impression of a user with associated voice qualities superimposed over the spectrogram, in accordance with a disclosed embodiment.

FIG. 4 is a spectrogram 400 of a voice impression 401 of the user 114 with associated voice qualities 402A-B and 404A-B superimposed over the spectrogram 400, in accordance with a disclosed embodiment. The spectrogram 400, in an embodiment, represents the analysis provided to the user 114 by the audio analysis tool 108 over the client application 104. The illustrated spectrogram 400 includes sections 406 representing different portions of the simulation. For example, the first section 406 may illustrate when the user 114 answers the phone call 120, and the last section 406 may indicate closing remarks of the user 114 prior to ending the phone call 120. In an embodiment, the spectrogram 400 may illustrate portions of the training simulation spoken by the user 114 and portions of the training simulation that are provided to the user 114 during the training simulation (i.e., the simulated customer). In such an embodiment, each of the sections 406 alternate between the user 114 speaking and the simulation speaking. When providing feedback, the voice analysis training system 100 is capable of providing feedback representing the entire spectrogram 400, providing feedback relating to specific sections 406, or even providing feedback relating to specific words that the user 114 has trouble conveying in a positive or appropriate manner.

The associated voice qualities 402 and 404 superimposed over the spectrogram 400 include energy levels 402A-B and sales effectiveness 404A-B. The energy level 402A represents an ideal energy level of the user 114, and the energy level 402B represents the actual measured energy level of the user 114. Similarly, the sales effectiveness 404A represents an ideal sales effectiveness of the user 114, and the sales effectiveness 404B represents the actual measured sales effectiveness of the user 114. When the audio analysis tool 108 performs an analysis of the voice impression 401, the audio analysis tool 108 compares the actual performance 402B and 404B to the ideal performance 402A and 404A to determine a score 408. The score 408 represents how closely the user 114 kept the energy level 402B and the sales effectiveness 404B of the user 114 to the ideal energy level 402A and the ideal sales effectiveness 404A, respectively, during the training simulation. The score 408 also provides the user 114 with a target for improving simulation performance during subsequent training simulations. Additionally, the score 408 provides a manager of the user 114 with the ability to rank employees based on how effective the employees are in their sales calls.

It may be appreciated that the audio analysis tool 108 may perform analysis on any dialect or accent within a specific language, and even perform analysis on multiple languages with minimal reformatting of the audio analysis tool 108. Further, while the above description of the voice analysis training system 100 relies on a training simulations, in an embodiment, the audio analysis tool 108 may also provide live feedback during a phone conversation with a live customer to track speech of both the user 114 and the live customer. The audio analysis tool 108 may provide an indication of how receptive the tone of the live customer is to the current sales pitch in addition to providing a live indication of the effectiveness of the sales pitch provided by the user 114.

Figure 5:
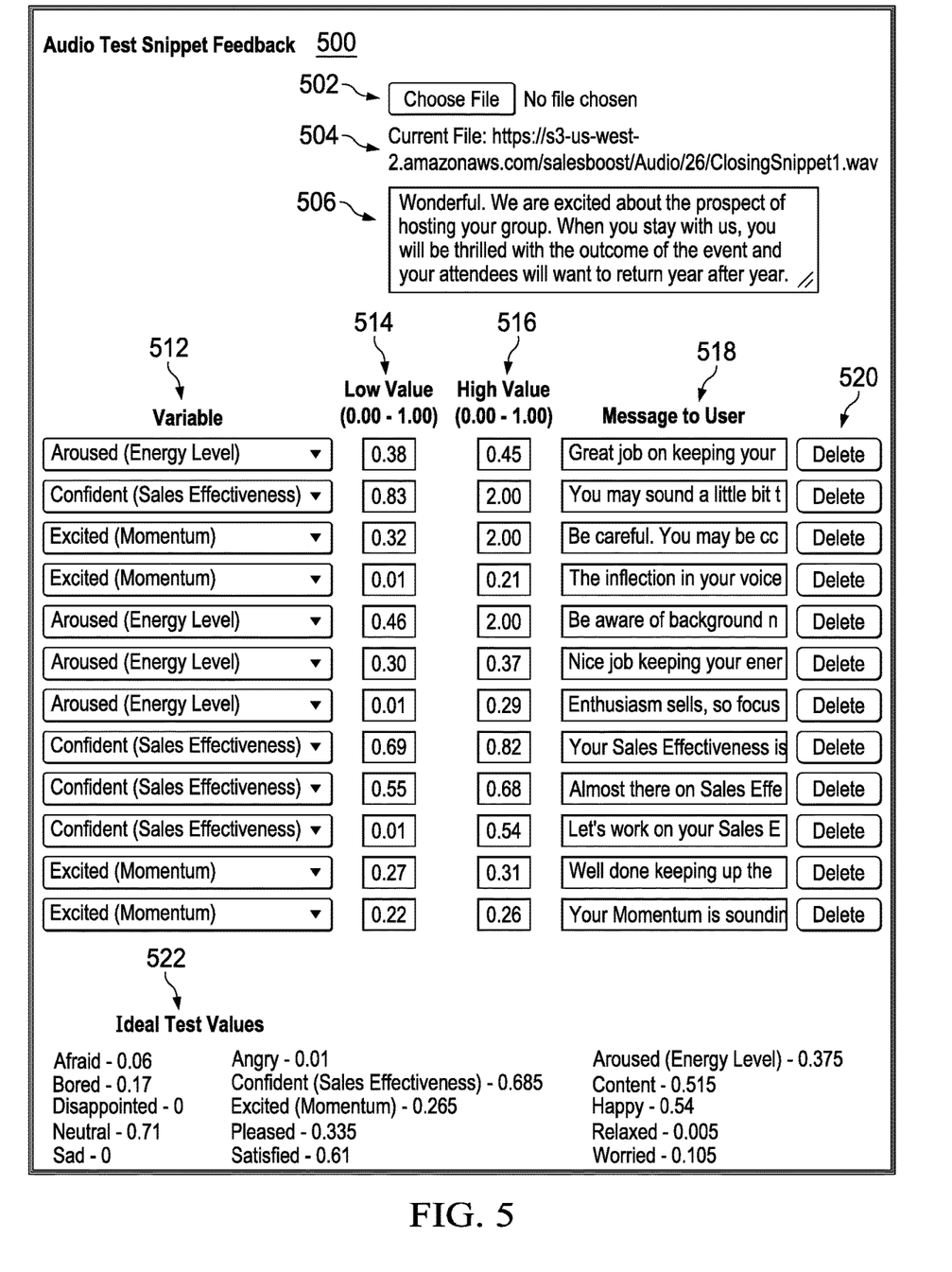
FIG. 5 is an illustration of a user interface of the determination of attributes of the voice of a user while communicating during a particular session for presentation of feedback to the user.

FIG. 5 is a diagram of one embodiment of a feedback user interface 500 illustrating feedback presented to a user of voice analysis training system 100. Feedback user interface 500 can be presented to the user on client application 104 or any other suitable graphical user interface.

Feedback user interface 500 includes a snippet selection affordance 502. The selection of snippet selection affordance 502 by a user initiates the display of a user interface (not shown) pursuant to which the user views and selects a list of snippets. Snippets are scripts, or portions of scripts, recorded for a particular customer representative in one or more sessions. For example, an entire conversation or script recitation may be recorded of a particular customer interaction or simulated customer interaction. Such conversation or script may be broken up into a number of different sections, including, for example, a customer introduction section, a customer needs exploration section, a service offerings section, a set up next customer contact section, and a closing section. Each of such sections may be its own separate snippet or may be broken down further into further subsections or individual sentences, each comprising a snippet. Such snippets may be taken from sessions that may include, without limitation prerecorded simulated sessions of the customer representative in particular training situations; live simulation sessions of the customer representative in a current and real-time simulation; prerecorded interactions of the customer representative with actual customers; or live interactions of the customer representative in a current interaction of the customer representative with actual customers.

Feedback user interface 500 also includes a current script identifier 504 and a script summary 506. Current script identifier 504 indicates an identifier that the user or voice analysis training system 100 has assigned to a particular snippet. Script summary 506 is an illustrated summary of the snippet. In one embodiment, script summary 506 illustrates a portion of a training script or prerecorded conversation, such as the text of a particular sentence of such script or conversation.

Feedback user interface 500 also includes a list of attribute indicators 512, a list of low attribute scores 514, a list of high attribute scores 516, a list of feedback 518, and a list of edit affordances 520. Attribute indicators 512 identify the attributes determined to be most significant in presenting feedback to a user. For example, attribute indicators 512 may indicate the attributes that are most important to a particular snippet, the attributes that are observed to be most present in a user's voice during the session corresponding to a snippet, and the attributes that are determined to be the ones in which the user is most deficient during such a session. In one embodiment, the attributes may be ordered based on any of the same criteria to be presented in an order of importance for a snippet, an order of prevalence in the session, or an order in which the user should work on such attribute. More than one attribute indicator 512 can be displayed for the same attribute to indicate attribute scores for a beginning, middle, and ending portion of a particular snippet.

The low attribute scores 514 are the lowest level of the attribute determined from the voice impression at any point during the session in which the particular script referenced by current script identifier 504 is communicated. Similarly, the high attribute scores 516 are the highest level of the attribute determined from the voice impression at any point during the session in which the particular script referenced by current script identifier 504 is communicated.

Feedback user interface 500 also includes a list of ideal attribute scores 522 for the particular snippet referenced by current script identifier 504. The ideal attribute scores 522 correspond to an attribute score determined to be most effective for communication of the particular snippet indicated by current script identifier 504 to be most effective. For example, the level of arousal (energy level) determined to be ideal for the snippet illustrated in FIG. 5 is 0.375.

Feedback 518 indicates feedback on the user's performance or effectiveness relative to a particular training session, a user's proficiency at a particular skill or situation, recommendations to improve the user's communication with respect to each particular attribute, or other suitable feedback from a training session. Such feedback may include, without limitation, adjusting the posture or position of the user while speaking, smiling, varying the speed, cadence, volume, tone, pitch of their speech (with or without recommendations on how to achieve such variance), taking particular courses, practicing voice exercises, speaking on video or in front of a mirror, learning more about a particular product, service, or customer, reducing background noise or distractions, raising enthusiasm levels, controlling anger, suggesting further practice of the snippet, or any other suitable assessment, recommendation, training, or other suitable feedback.

Edit affordances 520 are affordances that are selectable by a user to delete a particular attribute from feedback user interface 500 or reorder the attributes that are presented to the user. For example, a user may want to delete or reorder attributes that the user has mastered to focus on feedback on attributes for which the user still needs practice.

In operation, the range of attribute scores for a particular attribute associated with one of attribute indicators 512 defined by the low attribute score 514 and the high attribute score 516 can be compared to the ideal attribute score 522 associated with the particular attribute to determine feedback given to a user. Feedback 518 may be determined based on such comparison, based on the attribute scores, based on the content of a particular snippet or session, based on the goal of a particular session, based on the business function or role of the user (for example, sales vs. customer service), based on the experience level of the user at a particular business function or role, or any combination of the foregoing. For example, if the arousal (energy level) of a user during a session is too high, the feedback 518 may suggest that the user slow down, enunciate words more precisely, and speak in a lower and calmer tone. Similarly, if the arousal (energy level) of a user during a session is too low, the feedback 518 may suggest that the user speed up and speak more energetically. In one embodiment, certain feedback 518 may be based on more than one attribute score. For example, low scores of confidence, arousal (energy level), and excitement may lead to recommendations of training exercises to increase the user's overall effectiveness as a sales associate.

Although not illustrated, additional information regarding each attribute score during a particular session may be displayed, such as the average of each attribute score, the number of times that a user strayed from an ideal attribute score, an acceptable deviation from the ideal attribute score, or other suitable information. In one embodiment, attribute indicators 512 are affordances that are selectable by a user to display additional information regarding the corresponding attribute such as a graph or other indication of how the attribute varies as each word of the snippet is or was communicated by a user.

In one embodiment, voice analysis training system 100 includes a user interface to track the user's progress as a whole based on an aggregated analysis of all of the sessions recorded for such user. In such a manner, the user's performance relative to particular types of sessions, such as initial lead contacts, presentation of alternate products and services, or closing of sales, may be evaluated. Similarly, the user's progress in demonstrating a particular attribute such as confidence across all sessions may be monitored. Using such aggregated analysis data, recommendations such as feedback 518 may be better determined based on larger amounts of data in different situations and over time. Such recommendations may include assessing the level of the user in particular job functions or sub-functions, recommending particular training courses or groups of courses, further education in particular products or services of a company, or rehearsing particular scripts to simulate particular circumstances. In such a manner, voice analysis training system 100 can automatically determine gaps in a user's training or performance and address deficiencies that are leading to poor job performance or lost sales opportunities.

The above-disclosed embodiments have been presented for purposes of illustration and to enable one of ordinary skill in the art to practice the disclosed embodiments, but are not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

Additionally, although specific terms are employed herein, they are used in a generic and descriptive sense only and not for purposes of limitation, instance, the term database, as used herein, is intended to include any form of organized data, including, but not limited to, data found in tables, charts, spreadsheets, and documents. Furthermore, the term database does not imply the use of a particular or specialized database software, the use of any particular data structure, nor does it imply the use of any particular hardware.

What is claimed is:

1. A method for performing voice analysis, the method comprising:
   storing, in a database, a simulation file for conducting a training session with a user, the simulation file including at least a script;
   further storing, in the database, desired attributes associated with the simulation file;
   retrieving, by a server, the simulation file from the database;
   providing, by a client application, a user interface to conduct the voice analysis using the simulation file from the database;
   receiving, at the client application, one or more voice impressions from a user;
   analyzing, at an audio analysis tool, at least one of the voice impressions of the user;
   determining, at the audio analysis tool, attributes of the at least one voice impression in response to analyzing the at least one voice impression;
   comparing, at the audio analysis tool, the determined attributes to the desired attributes associated with the simulation file; and
   providing, by the client application, feedback to the user based on the comparison;
   wherein the determined attributes include an actual energy level and an actual sales effectiveness;
   wherein the desired attributes includes an ideal energy level and an ideal sales effectiveness.

2. The method of claim 1, wherein storing the simulation file comprises storing snippets of the simulation file.

3. The method of claim 2, wherein storing the desired attributes comprises storing desired attributes for each snippet of the simulation file.

4. The method of claim 3, wherein storing the desired attributes further comprises storing acceptable ranges of the desired attributes.

5. The method of claim 4, and further comprising storing the feedback in the database.

6. The method of claim 5, wherein storing the feedback comprises storing feedback for each desired attribute.

7. The method of claim 6, wherein storing the feedback comprises storing feedback for a particular measured level of such desired feedback.

8. The method of claim 7, wherein storing the feedback further comprises storing feedback for each desired attribute for each segment.

9. The method of claim 8, wherein receiving one or more voice impressions from a user comprises receiving a plurality of snippets of the one or more voice impressions.

10. The method of claim 9, wherein analyzing at least one of the voice impressions comprises analyzing each of the plurality of snippets of the at least one of the voice impressions.

11. The method of claim 10, wherein determining attributes of the at least one voice impression comprises determining attributes of one of the plurality of snippets of the at least one voice impression.

12. The method of claim 11, wherein comparing the determined attributes to the desired attributes further comprises comparing the determined attributes of the one of the plurality of snippets of the at least one voice impression to the desired attributes of one of the snippets of the simulation file, wherein the snippet of the at least one voice impression is received in response to communicating the one of the snippets of the simulation file to the user during the voice analysis.

13. The method of claim 1, wherein each of the desired attributes include a particular attribute and a desired level of such attribute.

14. The method of claim 1, wherein providing feedback to the user based on the comparison includes the recommendation of a training course.

15. The method of claim 1, where providing feedback to the user based on the comparison includes an assessment of a proficiency level of the user.

16. The method of claim 1, wherein providing feedback to the user based on the comparison includes a recommendation to change the voice of the user.

17. The method of claim 1, wherein providing feedback to the user based on the comparison includes a recommendation to change the posture of the user.

18. The method of claim 1, wherein providing feedback to the user based on the comparison includes providing feedback on a plurality of different desired attributes associated with a particular snippet of the voice impression.

19. A voice analysis training system comprising:
   a database configured to store a simulation file for conducting a training session with a user, the simulation file including at least a script, and wherein the database is further configured to store desired attributes associated with the simulation file;
   a server in communication with the database and operable to retrieve the simulation file from the database;
   a client application in communication with the server and operable to cause the display of a user interface to conduct the voice analysis using the simulation file, and wherein the client application receives one or more voice impressions from a user and communicates the one or more voice impressions to the server;
   an audio analysis tool in communication with the server and operable to receive at least one of the voice impressions of the user and determine attributes of the at least one voice impression in response to analyzing the at least one voice impression, wherein the audio analysis tool is further operable to compare the determined attributes to the desired attributes associated with the simulation file; and wherein the client application is operable to provide feedback to the user in response to the comparison;

wherein the determined attributes include an actual energy level and an actual sales effectiveness;

wherein the desired attributes includes an ideal energy level and an ideal sales effectiveness.

20. A non-transitory machine readable storage medium comprising instruction that, when executed, cause a processor to:

store, in a database, a simulation file for conducting a training session with a user, the simulation file including at least a script;

further store, in the database, desired attributes associated with the simulation file;

retrieve, by a server, the simulation file from the database;

provide, by a client application, a user interface to conduct the voice analysis using the simulation file from the database;

receive, at the client application, one or more voice impressions from a user;

analyze, at an audio analysis tool, at least one of the voice impressions of the user;

determine, at the audio analysis tool, attributes of the at least one voice impression in response to analyzing the at least one voice impression;

compare, at the audio analysis tool, the determined attributes to the desired attributes associated with the simulation file; and provide, by the client application, feedback to the user based on the comparison;

wherein the determined attributes include an actual energy level and an actual sales effectiveness;

wherein the desired attributes includes an ideal energy level and an ideal sales effectiveness.

* * * * *